United States Patent [19]

Vicard et al.

[11] Patent Number: 5,333,149
[45] Date of Patent: Jul. 26, 1994

[54] PROCESS AND A CIRCUIT FOR ADAPTING COEFFICIENTS IN A MODEM EQUALIZER

[75] Inventors: Dominique Vicard, Echirolles; William Glass, Seyssinet-Pariset; Francois Druilhe, Seyssins, all of France

[73] Assignee: SGS-Thomson Microelectronics S.A., Saint-Genis Pouilly, France

[21] Appl. No.: 930,901

[22] Filed: Aug. 17, 1992

[30] Foreign Application Priority Data

Aug. 19, 1991 [FR] France .................. 91 10651

[51] Int. Cl.⁵ .............................................. H03H 7/30
[52] U.S. Cl. ................................. 375/14; 375/11; 364/724.2
[58] Field of Search ................ 375/11, 14; 333/18, 333/724.19, 724.2

[56] References Cited

U.S. PATENT DOCUMENTS

| | | | |
|---|---|---|---|
| 4,237,554 | 12/1980 | Gitlin et al. | 375/15 |
| 4,384,355 | 5/1983 | Werner | 375/14 |
| 4,718,073 | 5/1980 | Takaoka | |
| 5,097,482 | 3/1992 | Serizawa et al. | 375/14 |
| 5,216,629 | 6/1993 | Gurcan et al. | 364/724.19 |

FOREIGN PATENT DOCUMENTS

A0419225 of 0000 European Pat. Off. .
WOA8000863 of 0000 World Int. Prop. O. .
WOA8101089 of 0000 World Int. Prop. O. .

*Primary Examiner*—Stephen Chin
*Assistant Examiner*—T. Ghebretinsae
*Attorney, Agent, or Firm*—Wolf, Greenfield & Sacks

[57] ABSTRACT

A process and a circuit for carrying out the process for adapting coefficients in a modem equalizer comprises a memory cell for storing a coefficient, an adapter receiving the output of the cell and providing a first signal having a first correction, and an adder receiving the first signal and providing a second signal to the cell. The adder also receives a value k much smaller than 1 having the sign provided by a comparator comparing an initial value of the considered coefficient and its current value.

29 Claims, 4 Drawing Sheets

PROCESS AND A CIRCUIT FOR ADAPTING COEFFICIENTS IN A MODEM EQUALIZER

BACKGROUND OF THE INVENTION

The present invention relates to the field of modulators/demodulators (modems) which are electronic circuits intended to transmit digital data on a telephone line or another network.

Telephone lines exhibit distortions of group propagation time and amplitude and therefore, to obtain satisfactory demodulation conditions, these distortions have to be compensated for. This is achieved by means of an equalizer, generally constituted by an auto-adaptive Finite Impulse Response (FIR) filter.

Such equalizers are well known and a specific implementation is, for example, described in U.S. Pat. No. 4,237,554. As indicated in this patent, the coefficients of the self-adaptive filter constituting the equalizer are periodically updated, for example at the rate of bauds, that is, at each symbol arrival. Thus, each coefficient is stored and, at each clock time, the stored value is modified by an adapter which is provided at its input with the present datum and with an error signal issued, for example, by a least square circuit. The least square circuit compares a received symbol, processed by the equalizer, with a stored symbol. In addition, the adapter is associated in the above patent with a tap leakage circuit which decreases the value of the adapted coefficient by a very-small constant value, having the sign of the preceding coefficient. The object of the tap leakage circuit is to get rid of the accumulated rounding errors when calculations are performed in finite arithmetic.

Generally speaking, the known tap leakage processes consist in bringing the coefficients near 0, either by multiplying them by a constant slightly smaller than 1, or by adding a small value, the sign of which is the inverse of the coefficient sign.

Some equalizers simultaneously achieve a channel equalization and a Hilbert transform, thus carrying out, in a single filtering operation, the equalization and the calculation of the complex analytic signal. When these equalizers are used, the quiescent position of the equalizer is no longer a filter essentially formed by null coefficients, but a filter achieving the analytic signal transform. Then, the tap leakage introduces a shift in the desired response. Moreover, in some equalizer structures, at the stationary state, when the equalizer has converged, the signal being of the limited band type, the auto-adaptative algorithm no longer has information on the input signal portions included outside the useful band. Then, a coefficient drift occurs, which is especially high in the case of complex coefficient equalizers and this is liable to introduce high gains outside of the useful band of the signal. This drift can be increased by a tap leakage. A priori, this is not an inconvenient since it occurs outside the useful band but, in fact, the line can be impaired by broad spectrum noises having high energy, such as pulse noises, and these noises will no longer be eliminated by the equalizer.

SUMMARY OF THE INVENTION

To avoid these drawbacks, the invention provides for storage of a coefficient quiescent value, then for recall of coefficients while accounting for the instantaneous difference between the quiescent value and the present value of a coefficient. Thus, it is ensured that coefficients are always recalled with the proper sign with respect to the quiescent value.

More particularly, the invention provides a process for adapting coefficients in a modem equalizer comprising the steps of periodically storing a coefficient value, periodically correcting this coefficient by an error signal associated with the detection of at least one symbol provided to the modem, and periodically correcting this coefficient by a recall signal. According to this process, the recall signal is the product of an additive constant much smaller than 1 multiplied by the sign of the difference between the current value of the coefficient and an initial value of this coefficient.

The above initial value is preferably determined during the modem hand shake phases at the beginning of communication or during this communication.

The invention further provides a circuit for adapting coefficients in a modem equalizer, comprising a cell for storing a coefficient; adapting means receiving the cell output and providing a first signal having a first correction; and adding means receiving the first signal and providing a second signal to the cell. The adding means receive in addition to the first signal a value k, much smaller than 1, having the sign provided by a comparator between an initial value of the considered coefficient and its current value.

BRIEF DESCRIPTION OF THE DRAWINGS

The foregoing and other objects, features and advantages of the invention will be apparent from the following detailed description of preferred embodiments as illustrated in the accompanying figures wherein.

In the following description, the various data will be dealt with as if they were single words. It will be noticed that in practice, as indicated in the above patent, data generally appear in the form of complex data and must be processed by crossed parallel stages.

DETAILED DESCRIPTION OF THE INVENTION

Figure 1:
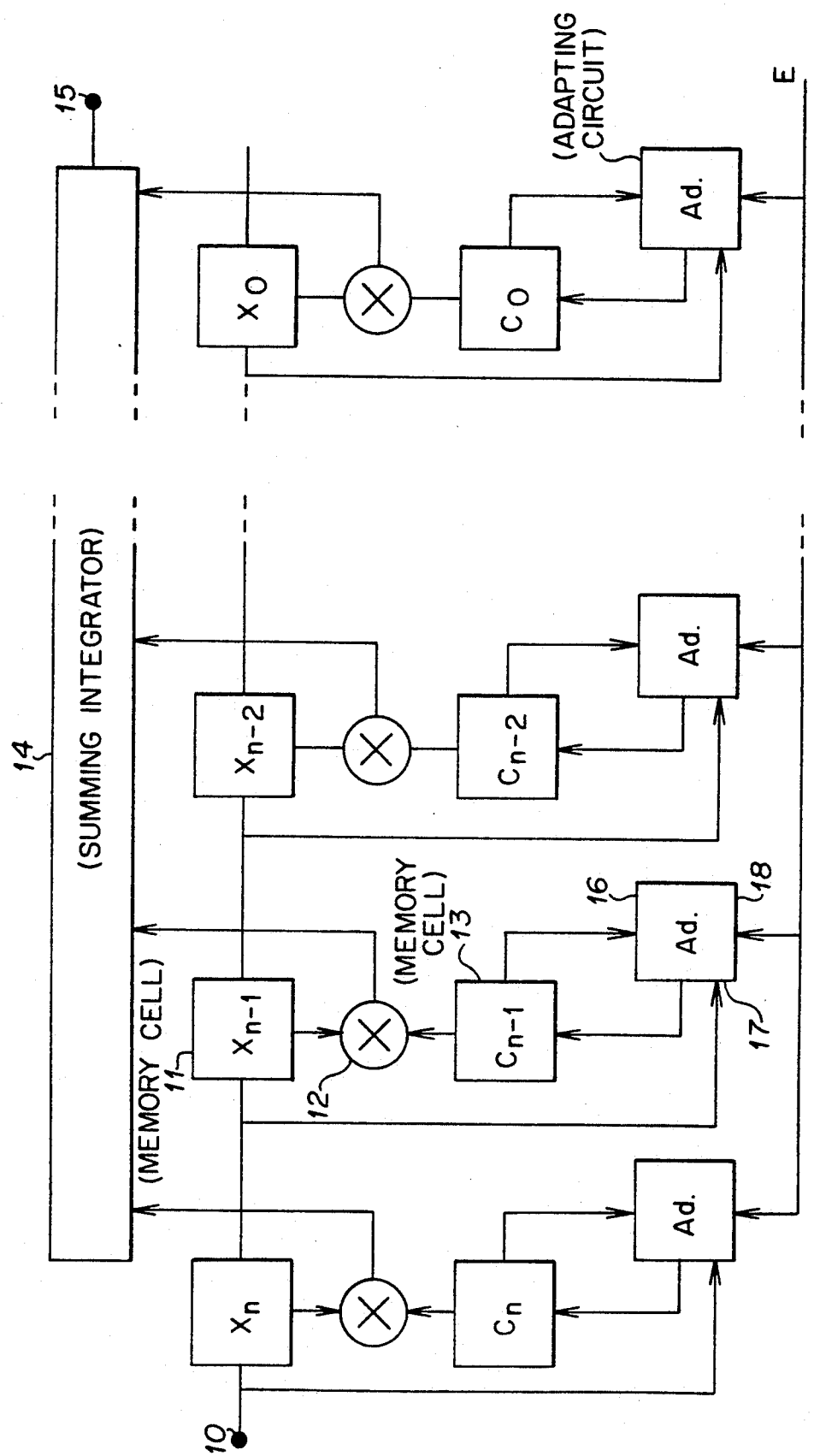
FIG. 1 shows the conventional architecture of a FIR filter.

FIG. 1 shows the conventional structure of an auto-adaptative FIR filter. This filter comprises a data input 10 on which appears the successive data $X_0$, $X_1$, $X_2$, ... $X_n$, which are shifted into the memory cells 11 connected in register mode. The filtering operation includes multiplying in a multiplier 12 each datum $X_i$ by a coefficient $C_i$ temporarily stored in a memory cell 13. The result of each multiplication is provided to a summing integrator 14 which provides at its output 15 a filtered signal. Each memory cell 13 is associated with an adapting circuit 16 which receives the stored datum and provides an adjusted datum during the next clock period. The datum is adjusted as a function of the next incoming datum provided at an input 17 of the adapter and of an error signal E provided at an input 18 of the adapter. The error signal E results from the measurement of the difference between a filtered datum (a symbol provided at the output of summing integrator 14) and prestored expected symbols, the successive differences being for example processed in accordance with the least square method. The error signal E in combination with the data signal X is processed in the adapter in a known way for providing a correcting coefficient C, especially accounting for the magnitude of the X amplitude variation.

Figure 2:
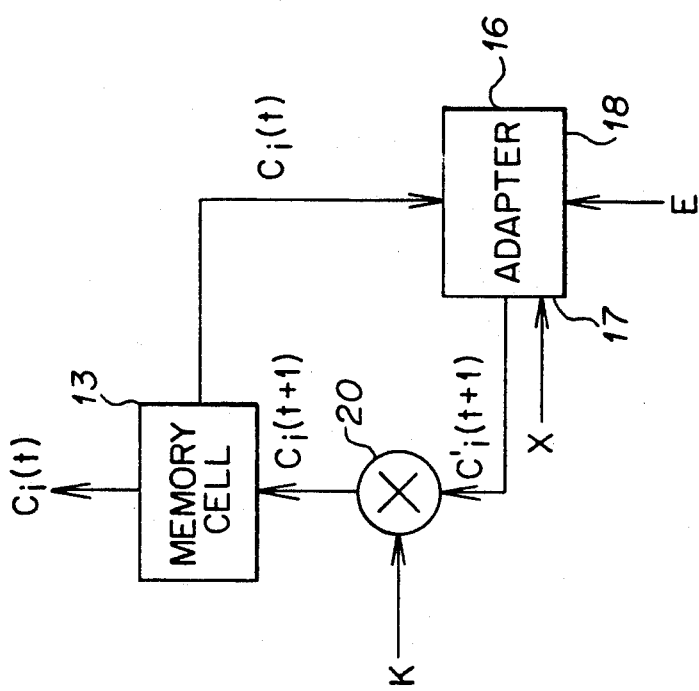
FIGS. 2 and 3 show conventional circuits for adapting the coefficients of an equalizer.
Figure 3:
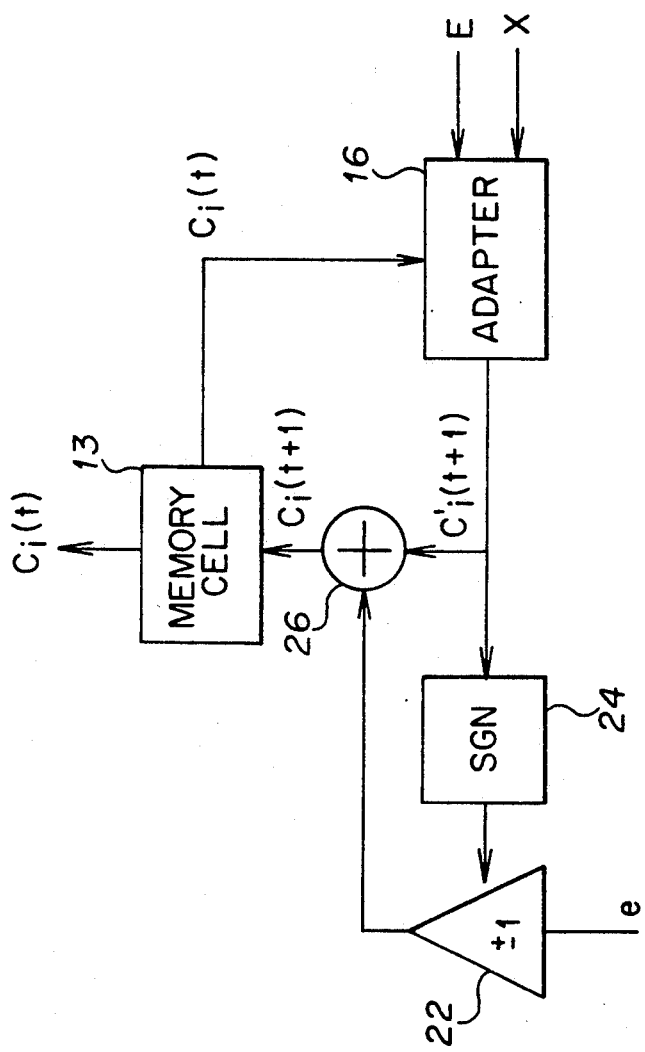

FIGS. 2 and 3 show known variants of adapting modules provided with tap leakage means. The memory cell 13 contains at a given time a coefficient $C_i(t)$ provided to multiplier 12. Simultaneously, this coefficient $C_i(t)$ is provided to adapter 16 where it is processed and changed into a coefficient $C'_i(t+1)$.

In FIG. 2, coefficient $C'_i(t+1)$ is provided back to the input of the memory cell 13 after passage in a multiplier 20 which carries out a multiplication by a factor K slightly smaller than to provide the next coefficient $C_i(t+1)$.

Another adaptation mode is shown in FIG. 3 and corresponds to what is described in above U.S. Pat. No. 4,237,554. In that case, the passage from $C'_i(t+1)$ to $C_i(t+1)$ is achieved by adding in an adder 26 a constant value e, close to 0, having the sign + or − given by a multiplier 22 as a function of the sign of coefficient $C'_i(t+1)$ determined by a circuit 24.

In both above conventional cases, it can be seen that coefficients are constantly brought back towards 0 and that this is achieved only as a function of the immediately preceding value of coefficient C.

Figure 4:
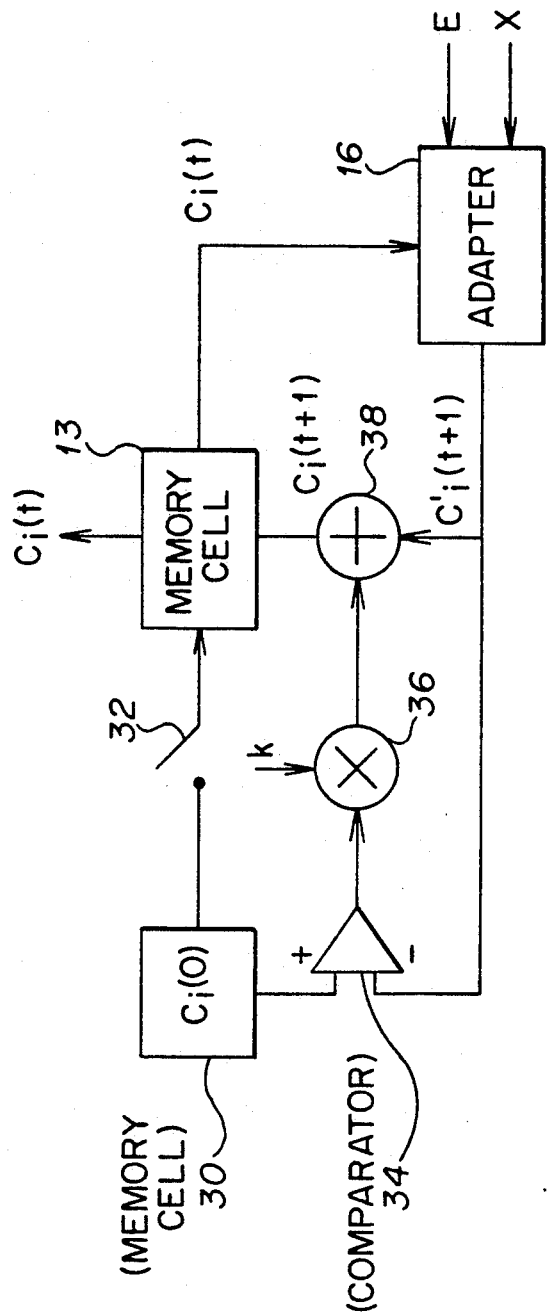
FIG. 4 schematically shows a circuit for adapting the coefficients of an equalizer according to the invention.

FIG. 4 shows an embodiment of an adapter implementing the invention.

The circuit according to the invention shows again the memory cell 13 storing a coefficient $C_i(t)$, then a coefficient $C_i(t+1)$, and an adapting module 16 providing a signal $C'_i(t+1)$ from a coefficient $C_i(t)$, an error signal E and a data value X. An additional memory cell 30 can be connected in parallel for the write mode on the memory cell 13. This connection for the write mode is symbolized by a switch 32. The content $C_i(O)$ of memory 30 is compared with value $C'_i(t+1)$ in a comparator 34 which provides a positive or negative output as a function of the sign of the difference. This value +1 or −1 is multiplied by a coefficient k close to 0 and value ±k is added to signal $C'_i(t+1)$ in an adder 38 for providing value $C_i(t+1)$. Thus, the circuit according to the invention provides:

$$C_i(t+1) = C'_i(t+1) - Sign[C'_i(t+1) - C_i(0)] * k$$

Value $C_i(0)$ is a value determined at the beginning of a communication by the considered modem. In fact, at the beginning of each communication, a hand shake phase is provided during which a first coefficient estimation is carried out. Thus, during the coefficient adaptation, even if the value of X goes very small, which impairs the operation of adapter 16, the coefficient $C_i(t)$ will nevertheless be recalled to its high or low initial value $C_i(0)$. It is to be noticed that, in practice, some telecommunication standards provide for resumption of the synchronization and hand shake phase at periodic intervals during a communication, this period being very long as compared to the period of symbols transmitted and received by the modem.

It will be noted that the various figures are simple exemplary illustrations and that the invention applies to complex coefficient adapters. In addition, when implementing the invention, it will often be possible to use, instead of specific circuits, a properly programmed microprocessor associated with memories.

We claim:

1. A method for adapting coefficients in a modem equalizer, comprising the steps of:

periodically storing a coefficient value;

periodically correcting the stored coefficient value using an error signal associated with detection of at least one symbol provided to the modem to produce a first corrected coefficient value; and periodically correcting the first corrected coefficient value to produce a second corrected coefficient value by adding to the first corrected coefficient value a recall signal comprising a product of an additive constant, much smaller than unity, and a sign of a difference between the first corrected coefficient value and an initial coefficient value.

2. The method of claim 1, further comprising the step of comparing the first corrected coefficient value to the initial coefficient value.

3. The method of claim 2, further comprising the step of determining the sign of the difference between the first corrected coefficient value and the initial coefficient value.

4. The method of claim 3, further comprising the step of storing the second corrected coefficient value.

5. The method of claim 4, further comprising the step of periodically storing the initial coefficient value.

6. The method of claim 5, further comprising the step of determining the initial coefficient value during a handshake phase of the modem at commencement of a communication operation.

7. The method of claim 5, further comprising the step of determining the initial coefficient value during a communication operation.

8. An adapter circuit for adapting coefficients in a modem equalizer, comprising:

first means for periodically storing a coefficient value;

means, coupled to the first means, for periodically correcting the stored coefficient value including means for processing an error signal associated with detection of at lest one symbol provided to the modem to produce a first corrected coefficient value; and means, coupled to the first means, for periodically correcting the first corrected coefficient value to produce a second corrected coefficient value to be stored in the first means, including means for adding to the first corrected coefficient value, a recall signal comprising a product of an additive constant, much smaller than unity, and a sign of a difference between the first corrected coefficient value and an initial coefficient value.

9. The circuit of claim 8, further comprising means for comparing the first corrected coefficient value to the initial coefficient value.

10. The circuit of claim 9, further comprising means for determining the sign of the difference between the first corrected coefficient value and the initial coefficient value.

11. The circuit of claim 10, further comprising means for periodically storing the initial coefficient value.

12. The circuit of claim 11, further comprising means for determining the initial coefficient value during a handshake phase of the modem at commencement of a communication operation.

13. The circuit of claim 11, further comprising means for determining the initial coefficient value during a communication operation.

14. A modem including a modem equalizer for adapting coefficients, comprising:

a first memory for storing a coefficient;

an adapter circuit having a first input coupled to the first memory for receiving the coefficient value stored therein, a second input for receiving a data signal, a third input for receiving an error signal, and an output providing a first corrected coefficient value; and an adder circuit having a first input coupled to the adapter circuit for receiving the first corrected coefficient value, a second input for receiving a recall signal, the recall signal comprising a product of an additive constant, much smaller than unity, and a sign of a difference between the first corrected coefficient value provided by the adapter circuit and an initial coefficient value, and an output, coupled to the first memory, providing a second corrected coefficient value that is the sum of the signals at the first and second inputs.

15. The modem of claim 14, further comprising an additional memory for storing the initial coefficient value.

16. The modem of claim 15, further comprising means for transferring the initial coefficient value from the additional memory to the first memory.

17. The modem of claim 16, further comprising a comparator having a first input coupled to the additional memory and a second input coupled to the output of the adapter circuit for comparing the first corrected coefficient value to the initial coefficient value and having an output providing a signal representing the sign of the difference between the first corrected coefficient value and the initial coefficient value.

18. The modem of claim 17, further comprising a multiplier having a first input coupled to the output of the comparator and a second input receiving the value of a coefficient much smaller than unity, and an output coupled to the second input of the adder, the multiplier multiplying signals at the first and second inputs and providing the recall signal at its output.

19. The circuit of claim 18, further comprising means for determining the initial coefficient value during a handshake phase of the modem at commencement of a communication operation.

20. The circuit of claim 18, further comprising means for determining the initial coefficient value during a communication operation.

21. A method for adapting coefficients in a modem equalizer, comprising the steps of:
periodically storing a coefficient value;
periodically correcting the stored coefficient value using an error signal associated with detection of at least one symbol provided to the modem to produce a first corrected coefficient value; and
periodically correcting the first corrected coefficient value to produce a second corrected coefficient value by adding to the first corrected coefficient value a recall signal comprising a product of an additive constant and a sign of a difference between the first corrected coefficient value and an initial coefficient value.

22. The modem of claim 21, wherein the additive constant is a value smaller than unity.

23. The modem of claim 22, wherein the additive constant is a value much smaller than unity.

24. An adapter circuit for adapting coefficients in a modem equalizer, comprising:
first means for periodically storing a coefficient value;
means, coupled to the first means, for periodically correcting the stored coefficient value including means for processing an error signal associated with detection of at least one symbol provided to the modem to produce a first corrected coefficient value; and
means, coupled to the first means, for periodically correcting the first corrected coefficient value to produce a second corrected coefficient value to be stored in the first means, including means for adding to the first corrected coefficient value, a recall signal comprising a product of an additive constant and a sign of a difference between the first corrected coefficient value and an initial coefficient value.

25. The modem of claim 24, wherein the additive constant is a value smaller than unity.

26. The modem of claim 25, wherein the additive constant is a value much smaller than unity.

27. A modem including a modem equalizer for adapting coefficients, comprising:
a first memory for storing a coefficient;
an adapter circuit having a first input coupled to the first memory for receiving the coefficient value stored therein, a second input for receiving a data signal, a third input for receiving an error signal, and an output providing a first corrected coefficient value; and
an adder circuit having a first input coupled to the adapter circuit for receiving the first corrected coefficient value, a second input for receiving a recall signal, the recall signal comprising a product of an additive constant, and a sign of a difference between the first corrected coefficient value provided by the adapter circuit and an initial coefficient value, and an output, coupled to the first memory, providing a second corrected coefficient value that is the sum of the signals at the first and second inputs.

28. The modem of claim 27, wherein the additive constant is a value smaller than unity.

29. The modem of claim 28, wherein the additive constant is a value much smaller than unity.

* * * * *